(12) United States Patent
Gage

(10) Patent No.: US 10,820,356 B2
(45) Date of Patent: Oct. 27, 2020

(54) METHOD AND SYSTEM FOR CONTENTION-BASED CHANNEL ALLOCATION

(71) Applicant: William Anthony Gage, Stittsville (CA)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 410 days.

(21) Appl. No.: 14/966,413

(22) Filed: Dec. 11, 2015

(65) Prior Publication Data

US 2017/0171890 A1  Jun. 15, 2017

(51) Int. Cl.
 *H04W 74/08* (2009.01)
 *H04W 74/00* (2009.01)
 *H04W 72/12* (2009.01)

(52) U.S. Cl.
 CPC ..... *H04W 74/0875* (2013.01); *H04W 74/004* (2013.01); *H04W 74/006* (2013.01); *H04W 72/1284* (2013.01)

(58) Field of Classification Search
 CPC ........... H04W 74/0875; H04W 74/004; H04W 74/006
 USPC ....................................... 370/329
 See application file for complete search history.

(56) References Cited

U.S. PATENT DOCUMENTS

| | | | |
|---|---|---|---|
| 6,628,945 B1* | 9/2003 | Koorapaty | H04W 74/0891 370/207 |
| 8,989,113 B2 | 3/2015 | Mukherjee et al. | |
| 2006/0268786 A1* | 11/2006 | Das | H04B 7/2618 370/335 |
| 2007/0201503 A1* | 8/2007 | Nishio | H04W 52/50 370/437 |

(Continued)

FOREIGN PATENT DOCUMENTS

| CN | 1960229 A | 5/2007 |
|---|---|---|
| CN | 101282576 A | 10/2008 |

(Continued)

OTHER PUBLICATIONS

Kaijie Zhou, "Dynamic Resource Allocation for Machine-Type Communications in LTE/LTE-A with Contention-Based Access", Apr. 2013.

(Continued)

*Primary Examiner* — Ricky Q Ngo
*Assistant Examiner* — Ellen A Kirillova

(57) ABSTRACT

A method and apparatus for contention-based communication over a shared channel is provided. Devices wishing to communicate over the channel transmit channel usage requests to a controller. The controller determines current demand for the channel based on the number of requests received, and dynamically allocates communication resources to the shared channel based on the demand. The controller then transmits grant messages directing the devices to use the shared channel in an indicated manner. The shared channel can be subdivided into sub-channels, each of which is contention-based. The controller can also allocate devices to sub-channels based on the type of request. The requests are transmitted over an access indication channel which can also be subdivided into sub-channels.

18 Claims, 9 Drawing Sheets

(56) References Cited

U.S. PATENT DOCUMENTS

| | | | | |
|---|---|---|---|---|
| 2008/0144633 | A1* | 6/2008 | Woloszynski | H04L 1/1829 370/395.31 |
| 2010/0214985 | A1* | 8/2010 | Chun | H04L 27/2602 370/328 |
| 2012/0014269 | A1 | 1/2012 | Ray et al. | |
| 2012/0127919 | A1* | 5/2012 | Cho | H04W 72/0413 370/315 |
| 2013/0064187 | A1* | 3/2013 | Patil | H04W 74/0858 370/329 |
| 2013/0201938 | A1* | 8/2013 | Seol | H04W 72/1284 370/329 |
| 2013/0315145 | A1* | 11/2013 | Bourlas | H04W 36/0016 370/328 |

FOREIGN PATENT DOCUMENTS

| | | |
|---|---|---|
| CN | 102904672 A | 1/2013 |
| CN | 104066145 A | 9/2014 |
| WO | 2009086664 A1 | 7/2009 |

OTHER PUBLICATIONS

Kelvin Au et al., "Uplink Contention Based SCMA for 5G Radio Access", Jul. 2014.

3GPP TS 36.211, "Evolved Universal Terrestrial Radio Access Network (E-UTRAN); Physical Channels and Modulation".

3GPP TS 36.331, "Evolved Universal Terrestrial Radio Access Network (E-UTRAN); Radio Resource Control (RRC) protocol specification".

3GPP R2-093812 (Ericsson), "Contention based uplink transmissions", Jun. 2009.

3GPP TR 23.887 "Study on Machine-Type Communications (MTC) and other mobile data applications communications enhancements".

IEEE 802.11 (2012), "Wireless LAN Medium Access Control (MAC) and Physical Layer (PHY) Specifications".

International Search Report dated Feb. 23, 2017 for corresponding International Application No. PCT/CN2016/108905 filed Dec. 7, 2016.

\* cited by examiner

METHOD AND SYSTEM FOR CONTENTION-BASED CHANNEL ALLOCATION

FIELD OF THE INVENTION

The present invention pertains to the field of communication systems, and in particular to a method and system for allocation of communication resources for use in implementing a contention-based channel.

BACKGROUND

Contention-based communication allows multiple users to share a common channel by defining transmission opportunities where multiple transmitters simultaneously attempt transmission. In conventional communication systems, provisioning of a contention-based channel involves a trade-off between resource utilization and transmission latency because the network does not have advanced knowledge of how many devices will be transmitting in the channel. At one extreme, too few devices transmit and the provisioned communication resources are wasted. At another extreme, too many devices transmit and collisions occur. Static resource allocations can fail to adequately accommodate variations in channel demand over time.

Dynamic allocation of communication resources to a contention-based channel can mitigate the above problems. However, providing satisfactory approaches to the resource allocation problem remains difficult.

Therefore there is a need for a method and apparatus for allocation of communication resources for use in implementing a contention-based channel that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for allocation of communication resources for use in implementing a contention-based communication channel wherein the allocated resources are configured in relation to current traffic demands. In accordance with embodiments of the present invention, there is provided a method for allocating communication resources. The method includes receiving, over an access indication channel, a set of channel usage requests from a plurality of communication devices requiring usage of a contention-based communication channel and allocating communication resources to the contention-based communication channel based on a determined current demand. The determined demand is related to the set of channel usage requests.

In accordance with embodiments of the present invention, there is provided a device for allocating communication resources. The device includes a receiver, configured to receive, over an access indication channel, a set of channel usage requests from a plurality of communication devices requiring usage of a contention-based communication channel. The device further includes a processor, configured to allocate communication resources to the contention-based communication channel based on a determined current demand. The determined current demand is related to the set of channel usage requests.

In accordance with embodiments of the present invention, there is provided a method for contention-based communication of a message. The method includes transmitting, by a communication device, a channel usage request for requiring usage of a contention-based communication channel over a selected sub-channel of the access indication channel. The method further includes receiving, by the communication device, an indication of communication resources allocated to the contention-based communication channel and transmitting, by the communication device, the message over the contention-based communication channel using the communication resources. The communication resources are obtained based on a determined current demand related to the channel usage requests.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
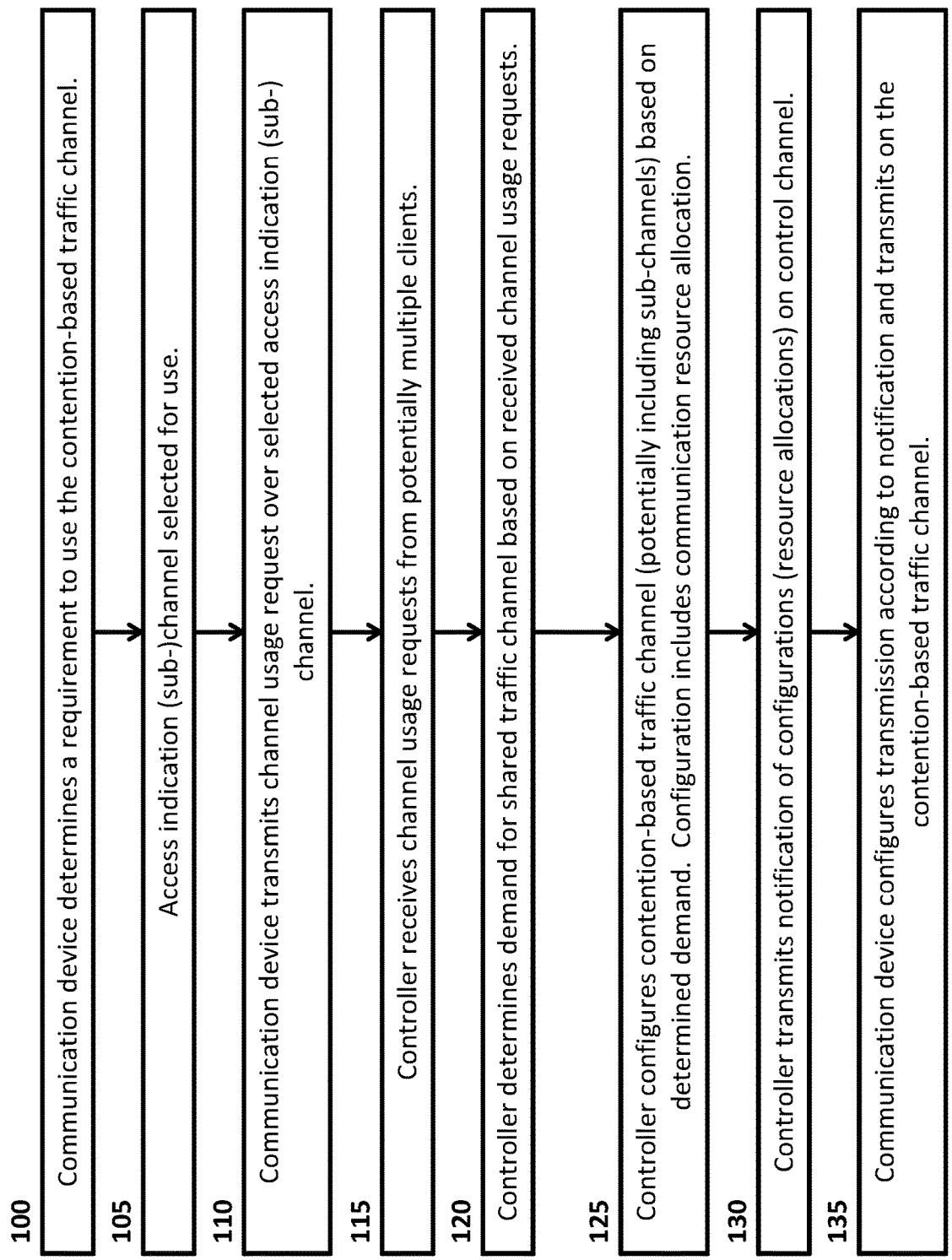
FIG. 1 illustrates a method for contention-based communication over a shared traffic channel, in accordance with embodiments of the present invention.

Embodiments of the present invention are directed toward facilitating contention-based communication over a shared traffic channel by a plurality of communication devices. Communication devices requiring usage of the contention-based traffic channel transmit channel usage requests over a pre-configured access indication channel. A controller then dynamically configures the shared contention-based traffic channel based on the received requests. The controller can determine a current demand for the shared traffic channel based on the requests. In some embodiments, the current demand is based at least partially on an estimate of the number of requests received. In some embodiments the current demand is based partially on types and/or content of the requests. Configuration of the contention-based traffic channel can include allocating communication resources thereto based on the current demand.

The current demand can include an indication of a total number of communication devices requesting usage of the shared traffic channel. In some embodiments, the current demand can include indications of the number of communication devices requesting usage of each of a plurality of sub-channels of the shared traffic channel. In some embodiments, the current demand can include other aspects of requirements of the communication devices requesting usage of the shared traffic channel which are discernible from appropriately configured channel usage requests. Such aspects of communication device requests can include priority information, latency requirements, bandwidth requirements, error tolerance, or the like. The channel usage requests can, in some embodiments, implicitly or explicitly include such information.

Embodiments of the present invention provide for dynamic allocation of resources to a contention-based traffic channel through the use of a separate access indication channel that can be used to gauge the magnitude and type of demand for the contention-based traffic channel. Resources are thereby allocated to the contention-based traffic channel in a demand-aware manner. Resources for the contention-based traffic channel are dynamically allocated by a controller based on demand explicitly received over a separate and preceding access indication channel.

Embodiments of the present invention relate to contention-based traffic channel access for an uplink channel between plural communication devices and a common node such as a Radio Edge Node of a wireless communication network. This enables communication in the uplink direction from the communication devices to the common node. The Radio Edge Node may be part of a cellular communication network such as a 3GPP™ Long Term Evolution (LTE) network or other type of wireless network serving potentially mobile communication devices. However, it is contemplated that embodiments of the present invention may be used for managing contention-based communication in other settings, such as in ad-hoc networks.

The term Radio Edge Node encompasses wireless Access Point, evolved NodeB, Base Station, wireless Access Router, Radio Network Controller and other radio access controllers.

As will be readily understood by a worker skilled in the art, contention-based communication involves transmission of messages by multiple communication devices on a shared channel, such as a wireless channel. When messages are transmitted concurrently, collisions may occur. Collision resolution can take place in accordance with a particular contention-based medium access protocol. Various contention-based protocols would be readily understood by a worker skilled in the art. In some embodiments of the present invention different contention-based sub-channels may utilize different contention-based protocols. Contention-based protocols may include but are not limited to ALOHA-like protocols, and Carrier Sense Multiple Access protocols.

In some embodiments, the contention-based traffic channel is divided into plural logical sub-channels. Each of the sub-channels is also a contention-based channel in that multiple communication devices can concurrently share a sub-channel using a contention-based protocol. Each sub-channel can accommodate communications based on particular characteristics. Characteristics may include, for example, device type, priority, message size, latency, and the like. Communication devices can implicitly or explicitly request usage of a particular type of sub-channel by selecting form and/or content of their channel usage request. Definition of the contention-based sub-channels can be performed a priori or dynamically in response to receipt of channel usage requests.

In some embodiments, a communication device can directly request usage of a particular contention-based traffic sub-channel by appropriate configuration of a channel usage request specifying that sub-channel. In some embodiments, a communication device can request access to a contention-based traffic channel having particular attributes, and an appropriate contention-based traffic channel can be assigned for use by that communication device based on the request.

In some embodiments, a set of signal codes may be provided for use as channel usage requests transmitted via the access indication channel or sub-channels thereof. The set of signal codes may be partitioned into multiple groups. In some embodiments, each group of codes corresponds to characteristics of the communication device and/or characteristics of the desired communication by the communication device. Channel usage requests are then associated with particular logical sub-channels based on the codes thereof.

FIG. 1 illustrates a method provided in accordance with embodiments of the present invention. In accordance with the method, a communication device determines 100 a requirement to use the contention-based traffic channel. The requirement may correspond to generation of data to be transmitted by the communication device. Further, an access indication channel or sub-channel is selected 105 for use. The access indication channel may be specified a priori for the communication device. An access indication sub-channel may be selected by the communication device based on current characteristics such as content of the data to be transmitted, or properties of the communication device. Alternatively, for example when the access indication channel is not divided into sub-channels, selection of a sub-channel may be omitted. Division of the access indication channel into sub-channels may be provided in some but not all embodiments, for example in response to a requirement to distinguish different types of contention-based access. The communication device transmits 110 a channel usage request over the selected access indication (sub-)channel. The channel usage request represents a notification that the communication device requires usage of the contention-based traffic channel.

A controller receives 115 the channel usage request from the communication device, typically but not necessarily along with other channel usage requests transmitted by other communication devices wishing to use the contention-based traffic channel. The controller then determines 120 current demand for the shared contention-based traffic channel based on the received channel usage requests. The demand may be determined based on the number and type of channel usage requests received. For example, the demand may correspond to an estimated number of communication devices transmitting channel usage requests. When multiple access indication sub-channels are present, the demand may indicate an estimated number of communication devices transmitting channel usage requests in each sub-channel.

In some embodiments, the controller then configures 125 the contention-based traffic channel based on the determined demand. Configuration of the contention-based traffic channel may include configuration of traffic sub-channels based on the determined demand in each of the corresponding access indication sub-channels. Configuration of a traffic channel or sub-channel may include dynamic allocation of communication resources for use by the channel or sub-channel. Allocated communication resources may include time intervals, frequency ranges, spreading codes, or the like. Allocation of the communication resources may comprise allocating a selected amount of bandwidth for use by the channel or sub-channel. Alternatively, the contention-based traffic channel may be pre-configured and dynamic configuration may be omitted.

The controller then transmits 130 notifications for each of the shared traffic sub-channel configurations via a control channel. In some embodiments, the requests received on different access indication sub-channels may be mapped onto one shared traffic sub-channel. The notifications may be transmitted on a control channel, such as a downlink control channel. The notifications may be broadcast on the control channel. The notifications may be grants transmitted on the control channel.

Upon receipt of a notification corresponding to its channel usage request, the communication device configures 135 its transmission and transmits the data on the contention-based traffic channel accordingly. The communication device may configure its transmission to use the communication resources allocated to the contention-based traffic channel or selected sub-channel thereof, said communication resources being as indicated in the notification. For example, different time slots, frequency resource blocks and/or spreading codes may be allocated to different contention-based traffic sub-channels, and each communication device may be notified, via the notification message, of which sub-channel it is to use.

Figure 2:
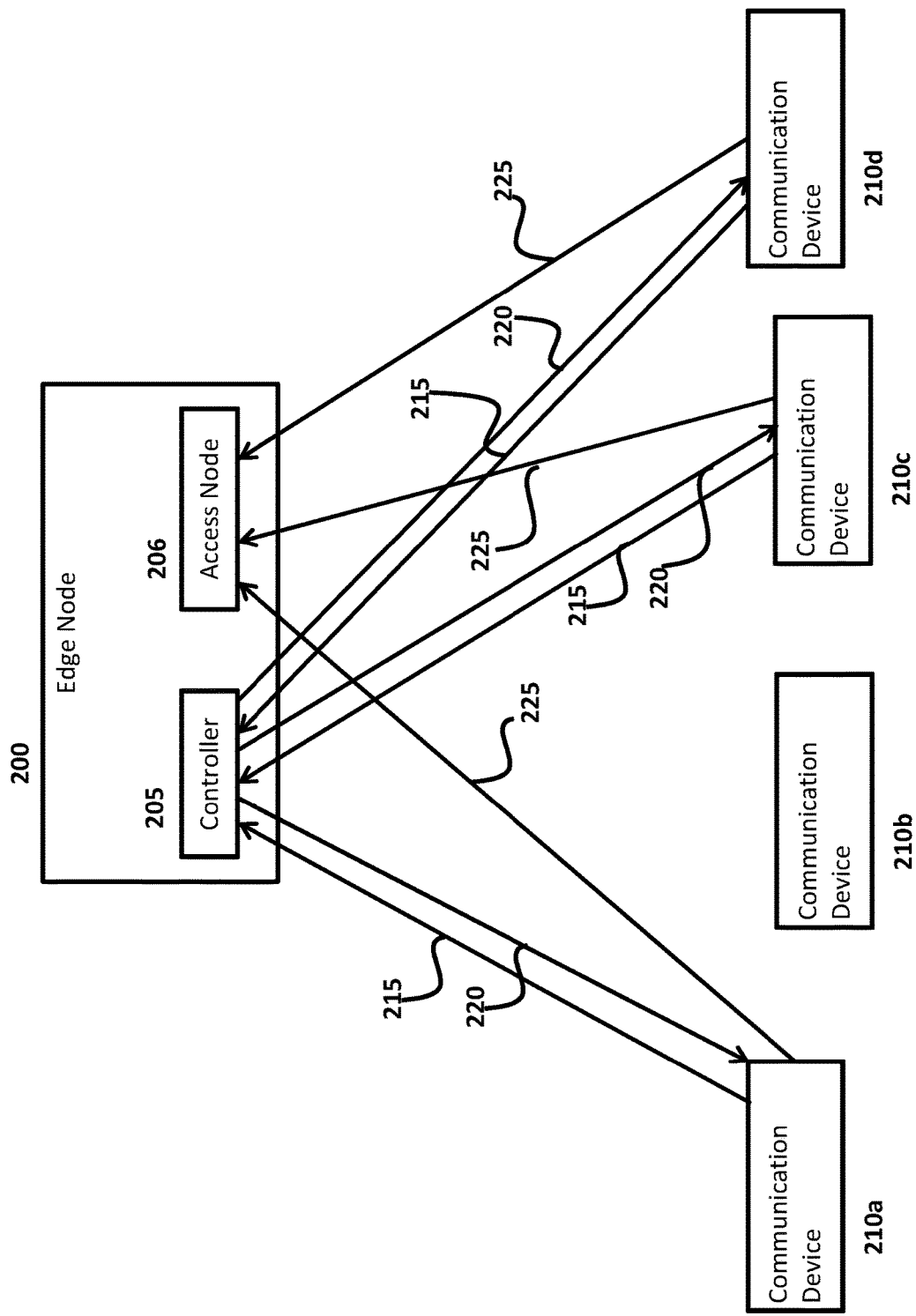
FIG. 2 illustrates a system for contention-based communication over a shared traffic channel, in accordance with embodiments of the present invention.

FIG. 2 illustrates a system provided in accordance with embodiments of the present invention. The system includes an edge node 200, such as a Radio Edge Node, which communicates with communication devices 210a, 210b, 210c, 210d via a communication link such as a wireless communication link. The communication devices may be User Equipment (UE) devices, Machine Type Communication (MTC) devices, or the like. The edge node 200 is comprised of a controller 205 which is configured to perform dynamic allocation of the contention-based traffic channel and an access node 206 which is configured to communicate with the communication devices over a contention based traffic channel. Dynamic allocation may include configuration of the contention-based traffic channel and/or sub-channels thereof. Dynamic allocation may include assignment of communication devices to the contention-based traffic channel at particular times. Communication devices wishing to use the contention-based traffic channel transmit channel usage requests 215 to the controller 205. The controller 205 configures the contention-based traffic channel based on the channel usage requests and transmits notifications 220 to the communication devices. The communication devices then transmit data 225 on the contention-based traffic channel to the access node 206 in accordance with access parameters specified in the notifications.

Figure 3:
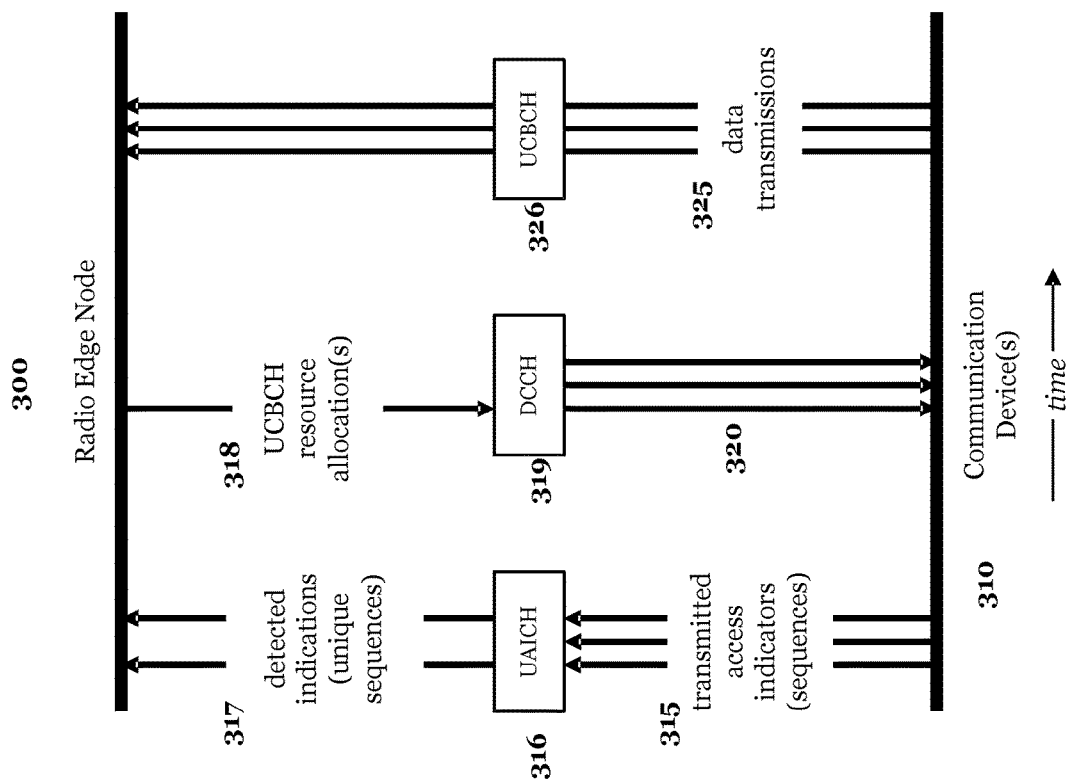
FIG. 3 illustrates messaging between a radio edge node and wireless communication devices in accordance with an embodiment of the present invention.

FIG. 3 illustrates messaging between a radio edge node 300 and communication devices 310 in accordance with an embodiment of the present invention. The communication devices transmit channel usage requests in the form of access indicators 315. The access indicators may comprise a limited number of codes, such as Zadoff-Chu sequences, as will be described below. The access indicators are transmitted via an Uplink Access Indication Channel (UAICH) 316. The access indicators correspond to requests for an Uplink Transmission Opportunity (ULTO). It is noted that multiple communication devices may potentially contemporaneously transmit the same access indicators in the same UAICH. The UAICH is pre-established using a limited set of communication channel resources.

The radio edge node detects 317 one or more access indicators, and determines corresponding demand for the contention-based traffic channel. The determined demand may be based at least partially on the number of unique access indicators received. The radio edge node then determines resource allocations for the Uplink Contention-Based Channel (UCBCH) 318, i.e. the shared traffic channel. Based on the number and type of access indicators detected, the radio edge node dimensions and schedules one or more regions of the UCBCH. Each region corresponds to a sub-channel of the UCBCH. Different regions may be allocated in order to accommodate different communication device types, different priorities, different latencies, different packet sizes, different codebooks of different communication devices, or the like. The allocations are announced to the wireless devices via grant messages 320 transmitted via a Downlink Control Channel (DCCH) 319. Each communication device determines a grant message corresponding to its access indicator and transmits 325 its data on an allocated region of the UCBCH 326 as indicated in the determined grant message.

In various embodiments, transmission of channel usage requests and control signals can be performed on a scheduled basis. For example, particular time slots can be set aside for use in transmitting the channel usage requests. The controller can then gauge current demand based on the channel usage requests transmitted in a recent set of time slots.

Embodiments of the present invention utilize a set of predetermined codes for use in transmission of channel usage requests. The codes may correspond to Constant Amplitude Zero Autocorrelation (CAZAC) sequences such as Zadoff-Chu sequences, or other readily discernible codes, such as orthogonal or quasi-orthogonal codes. When sending an access indicator, a communication device selects one of the codes. The selected code, suitably configured, may be used as the channel usage request. For example, a radio signal representative of the selected code (such as a Zadoff-Chu sequence) may be generated and transmitted as the channel usage request in a UAICH. Alternatively, the selected code may be used to configure the channel usage request in a different manner, for example by embedding the code in the request.

In some embodiments, a plurality of groups of codes, such as Zadoff-Chu sequences, may be provided, and selection of a code may comprise selection of a group of codes, followed by selection of a code from the selected group of codes. Each group of codes may correspond to a subset of all available codes, such as a predetermined set of Zadoff-Chu sequences. Selection of a group of codes may be based on selection criteria, for example reflecting one or more of: access priority of the message to be sent over the contention-based channel, a priority of the communication device transmitting the message, a time-sensitivity of the message, an error tolerance, a size of the message, a class of the communication device, a group identifier of the communication device, a location of the communication device, a type of the message, an application generating the message, or the like. Groups of codes may be defined for representing a wide variety of aspects of pending communications. In some embodiments, a group of codes may be selected based in part on pre-programmed communication device attributes, such as communication device class, communication device priority, and a designation of a transmission group of the communication device. In some embodiments, a group of codes may be selected based in part on current location of the communication device, for example a service area, routing area, traffic area, or paging area. In some embodiments a group of codes may be selected based in part on attributes of the data to be transmitted, for example message priority, latency requirements, and transmission error tolerance.

In some embodiments, each group of codes corresponds to a particular sub-channel of the UAICH. In some embodiments, logical sub-channels of the UAICH can be defined solely by the group of codes corresponding thereto. When a channel usage request is transmitted via a given sub-channel of the UAICH, access may be granted to a corresponding sub-channel of the UCBCH.

Figure 4:
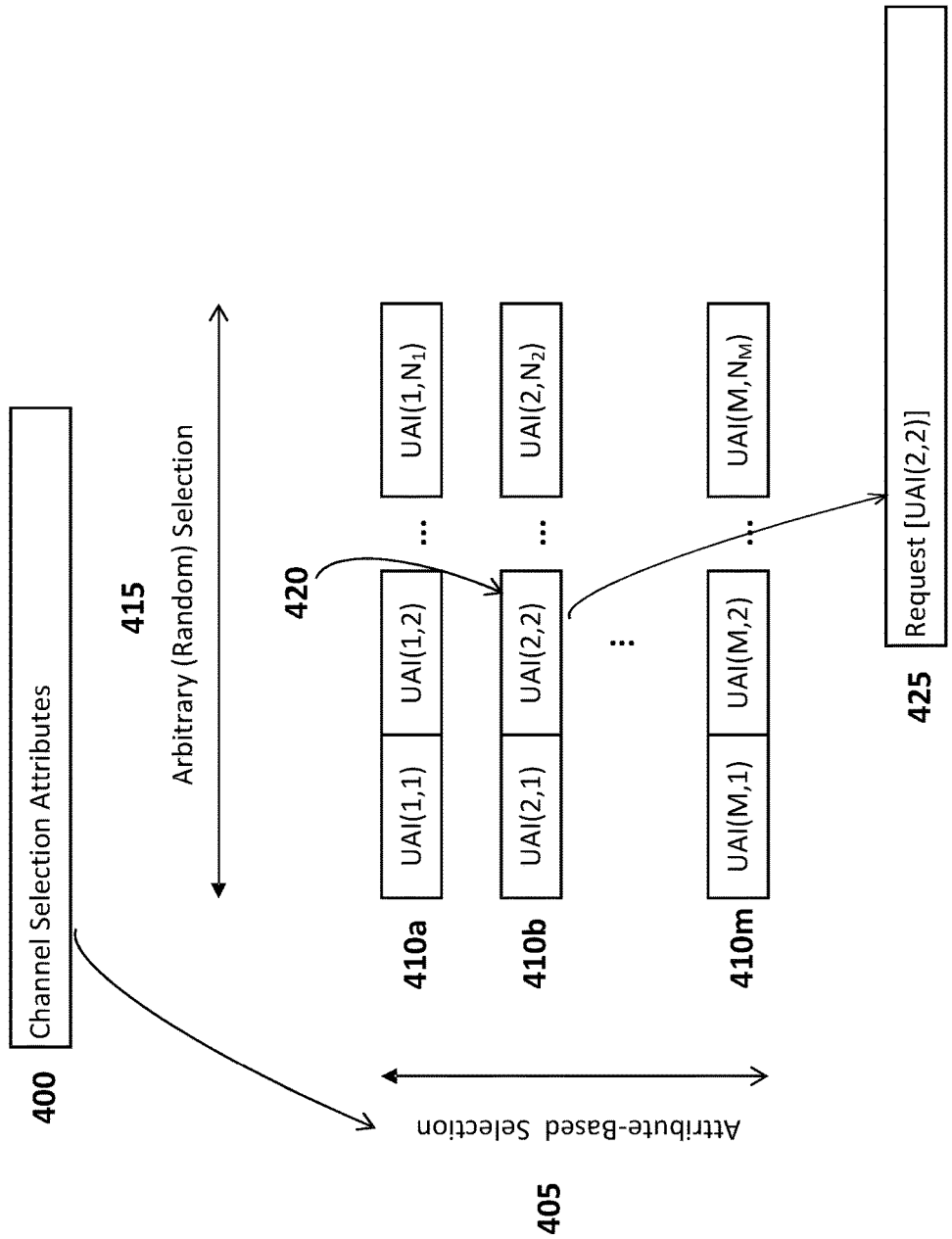
FIG. 4 illustrates generation of a channel usage request, in accordance with embodiments of the present invention.

FIG. 4 illustrates generation of a channel usage request, in accordance with embodiments of the present invention. Channel selection attributes 400, such as communication device status, message priority, or the like, are used to drive attribute-based selection 405 of one of M groups of codes 410a, 410b, . . . 410m. In the present example, each code is referred to as an Uplink Access Indicator (UAI) and each group of codes is referred to as a sub-channel of an Uplink Access Indication Channel (UAICH). Following selection of a group of codes, for example group 410b, one of the codes of the selected group is selected arbitrarily 415. Arbitrary selection may correspond to randomized selection, or another means of selection which tends to cause different communication devices to select codes in a substantially uncorrelated manner. That is, when two communication devices select codes from the same group, it is desired that they have a high probability of selecting different codes. A selected code 420 is used to generate the channel usage request 425. For example, the selected code may be a Zadoff-Chu sequence and the request may be a modulated signal corresponding to the Zadoff-Chu sequence. The channel usage request is transmitted via a set of communication resources allocated to the UAICH. Channel usage requests do not necessarily include an indication of identity of the transmitting communication device. Rather, the request messages may be anonymized.

In some embodiments, a UAI is a Zadoff-Chu sequence, or similar sequence or associated signal, selected from a set of sequences configured for use in the UAICH. The UAICH may correspond to a set of radio resources used for the transmission of UAIs. A UAICH may resemble a Sounding Reference Signal (SRS) symbol or a Physical Random Access Channel (PRACH), for example as used in the 3GPP™ Long Term Evolution (LTE) standard. A physical UAICH may comprise one or more logical UAICHs which correspond to the sub-channels of the UAICH as described above. Each logical UAICH comprises a subset of Zadoff-Chu sequences allocated for use by the physical UAICH. For example, a logical UAICH may correspond to a sequence partition reflecting one or more of: access priority, device priority, data message size, device class, device group, device location, etc. Sequence partitions may be as described in U.S. Pat. No. 8,989,113, for example.

In some embodiments, communication resources, such as radio spectral resources, of the access indication channel, and/or the codes used for communicating channel usage requests on the access indication channel, are configured by an entity of the communication network, such as a Radio Edge Node or other network controller, and communicated to the communication devices for use a priori. In some embodiments, resource and code allocations are broadcast semi-statically to communication devices, for example via a System Information Block or similar medium. In some embodiments, resource and code allocations are transmitted dynamically to communication devices, for example via Radio Resource Control (RRC) signaling. In some embodiments, resource and code allocations can be broadcast, multicast to groups of communication devices or unicast to specific communication devices.

In some embodiments, capacity of the contention-based channel and/or capacity of the contention-based sub-channels is configured based on a number of channel usage requests received. The capacity of a channel or sub-channel may be configured by allocating a corresponding amount and/or type of communication resources to that channel or sub-channel. Configuration of capacity may include provision of a corresponding amount of radio resources, such as time, frequency and/or code resources. Configuration of capacity may include provision of a desired type of communication resources, for example frequency bands having particular coherence, interference and/or noise characteristics.

In various embodiments, the access indication channel via which channel usage requests are transmitted, is a shared channel. Collisions on the access indication channel may be expected since the demand for the shared traffic channel may not be known a priori. The number of communication devices requesting usage of the contention-based traffic channel can be estimated in a variety of ways. In some embodiments, the number of communication devices requesting usage of the contention-based traffic channel is determined to be at least equal to the number of distinct channel usage requests observed in a predetermined period such as a time slot. Channel usage requests may be distinguished by their corresponding signal codes. In some embodiments, the number of communication devices requesting usage of the contention-based traffic channel is determined based on detection of duplicate channel usage requests of a particular type transmitted within the same period. For example, when multiple communication devices transmit channel usage requests based on the same signal code, the requests may constructively interfere. The constructive interference may be observed and an inference may be made that multiple communication devices are transmitting channel usage requests but have selected the same signal code. An estimate of the number of said multiple communication devices may be made based on the degree of constructive interference. In some embodiments, a model-based approach can be used to estimate the number of communication devices transmitting channel usage requests based on an observation of the number of distinct signal codes received, as well as an observation of potential constructive interference in the receipt of signal codes. A model or rule set may be used to determine a most likely number of communication devices transmitting channel usage requests based on an observation of activity on the access indication channel, including sub-channels thereof.

In some embodiments, where the codes correspond to Zadoff-Chu sequences or other CAZAC sequences, constructive interference may only occur when multiple devices simultaneously transmit the same Zadoff-Chu sequence. When transmit power control is used to equalize the power of signals normally received by a Radio Edge Node, a signal received with a higher power may be indicative of constructive interference.

The estimate of the number of communication devices transmitting channel usage request messages can be of varying precision. In one embodiment, the estimation technique may allow the estimate to be precise. In another embodiment, the estimation technique may indicate that the number of communication devices is, either: between 0 and $X_1$, between $X_1$ and $X_2$, or more than $X_2$, where $X_1$ and $X_2$ are arbitrary values. More or fewer ranges of numbers may be used. The estimate may be associated with a particular estimation error level.

Figure 5:
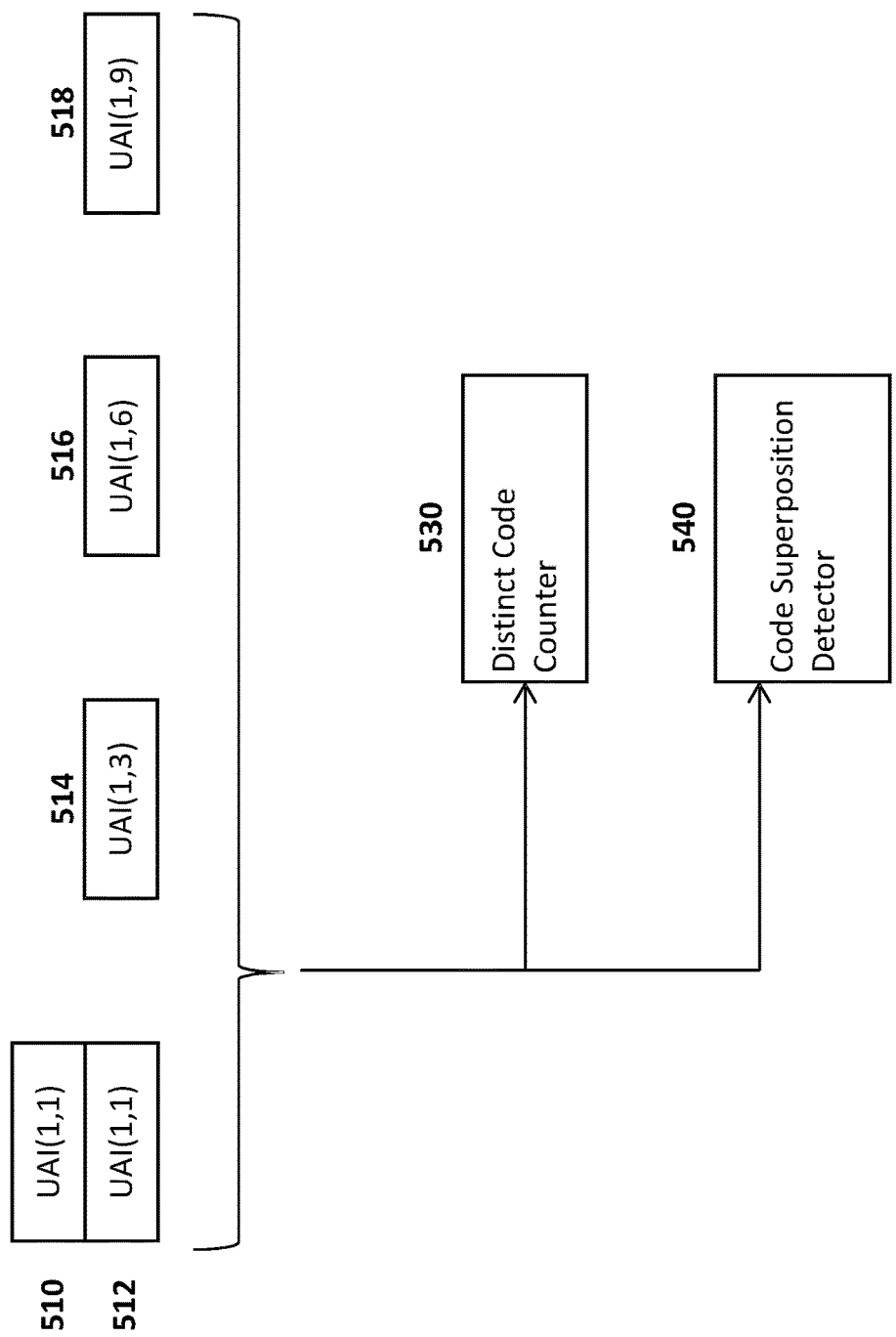
FIG. 5 illustrates an example of estimation of a number of communication devices transmitting channel usage requests, in accordance with embodiments of the present invention.

FIG. 5 illustrates an example of estimation of a number of communication devices transmitting channel usage requests, shown as UAI codes 510, 512, 514, 516, 518. A distinct code counter 530 counts the number of distinct UAI codes received in a time period such as a time slot. In the present example, codes 510 and 512 are the same, while all other codes are distinct. The distinct code counter therefore counts four distinct codes. A code superposition detector 540 estimates the number of non-distinct codes via observation of constructive interference. As codes 510 and 512 constructively interfere, the code superposition detector may detect this interference and determine that multiple copies of this UAI code have been transmitted. If the distinct code counter accurately detects four distinct codes and the code superposition detector accurately detects two copies of the first code, a determination can be made that five communication devices have transmitted channel usage requests.

In some embodiments, the controller configures one or more logical access indication channels based on parameters such as maximum target latency for contention-based uplink transmission and/or maximum amount of radio resources available for use by the access indication channel. For example, at one extreme, a logical access indication channel may correspond to a single Zadoff-Chu sequence. This sequence may be reserved for use within an existing PRACH region or SRS symbol, for example.

In some embodiments, the controller determines the number of detected channel usage requests that were received from communication devices in a corresponding interval, such as received Zadoff-Chu sequences. The controller may further determine the number of detected channel usage requests corresponding to each sub-channel of the access indication channel. If a given Zadoff-Chu sequence is transmitted (with an equalizing amount of transmit power) by multiple communication devices, the transmissions may constructively interfere and the number of requests may be estimated based on the amount of constructive interference.

The controller may then configure the contention-based traffic channel based on the estimated number of channel usage requests. Communication resources may be allocated to the contention-based traffic channel in proportion to the estimated number of channel usage requests. Communication resources may be allocated to each contention-based traffic sub-channel in proportion to the estimated number of channel usage requests received and associated with an access indication sub-channel. For example, if no channel usage requests are received in a predetermined time period, zero or minimal resources may be allocated to the contention-based traffic channel for a corresponding time period. As another example, a contention-based traffic sub-channel associated with channel usage requests specifying high priority and/or low latency may be configured to provide a lower probability of collision than a contention-based traffic sub-channel associated with channel usage requests specifying relatively lower priority and/or delay tolerance. As yet another example, a contention-based traffic sub-channel associated with channel usage requests specifying higher reliability of transmission may be allocated to use different waveforms or signal constellations than a contention-based traffic sub-channel associated with channel usage requests specifying lower reliability.

Figure 6:
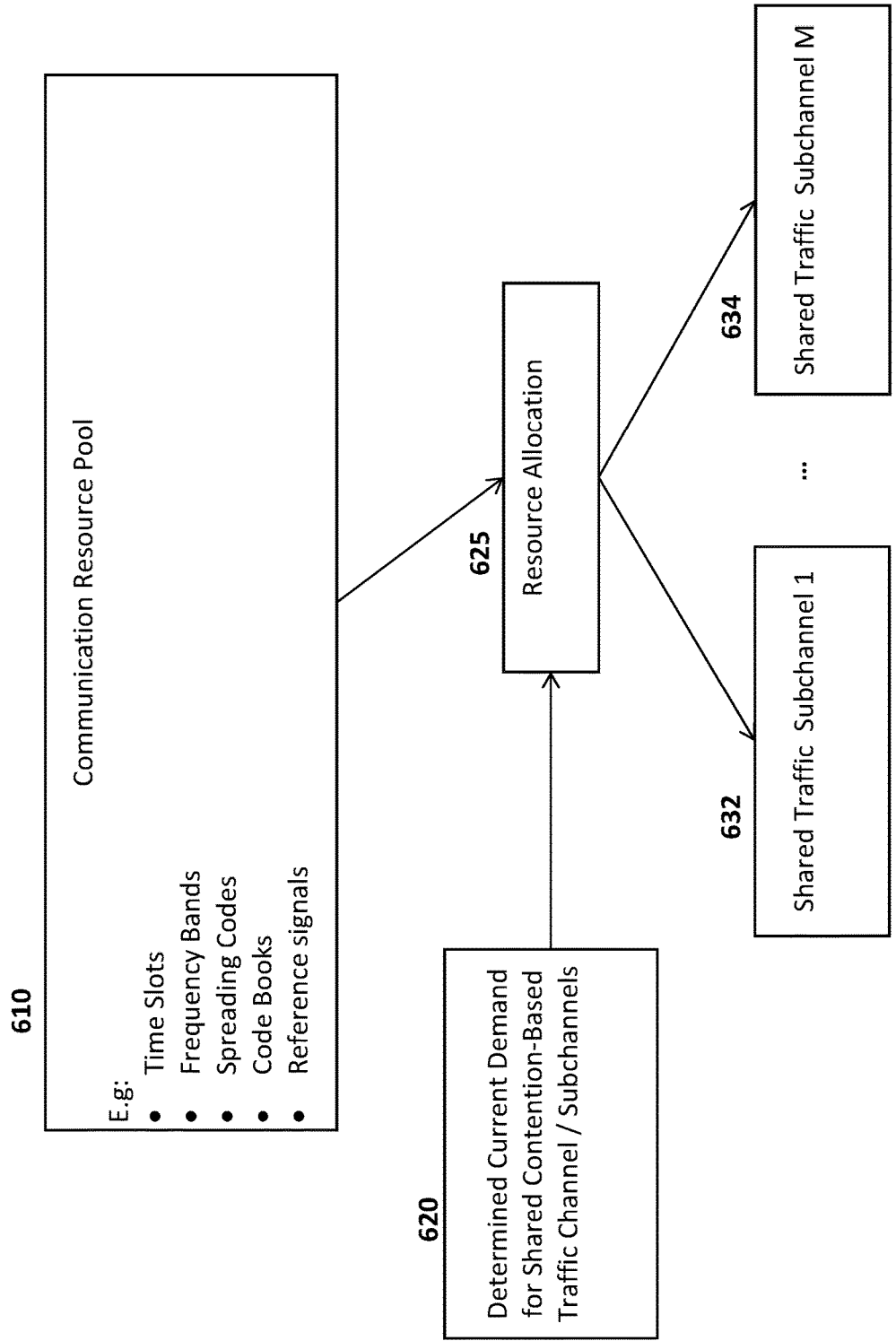
FIG. 6 illustrates allocation of communication resources to the contention-based traffic channel, in accordance with an embodiment of the present invention.

FIG. 6 illustrates allocation of communication resources to the contention-based traffic channel, in accordance with an embodiment of the present invention. A pool 610 of communication resources is provided, which can include resources such as time slots, frequency bands or sub-bands, spreading codes, code books, reference signals, antennas, modulation symbols, or other resources which can be used to access a given communication medium, such as a local portion of radio spectrum. Based on a determined current demand 620 for the shared contention-based traffic channel and/or sub-channels thereof, resources from the pool 610 are allocated 625 to the various sub-channels 632, 634 of the contention-based traffic channel. The resource allocation can be performed dynamically and adapted to variations in the determined demand. Unused resources from the communication pool may be allocated for other uses.

Following configuration of the contention-based traffic channel and/or sub-channels, the configurations may be announced through grant messages transmitted on a downlink control channel. For example, as shown in FIG. 7, a Downlink Control Information (DCI) message 730 in an LTE Physical Downlink Control Channel (PDCCH), representing a grant message for a particular contention-based traffic channel or sub-channel, may be encoded with a Radio Network Temporary Identifier (RNTI) that is associated with an access indication channel or sub-channel thereof.

Figure 7:
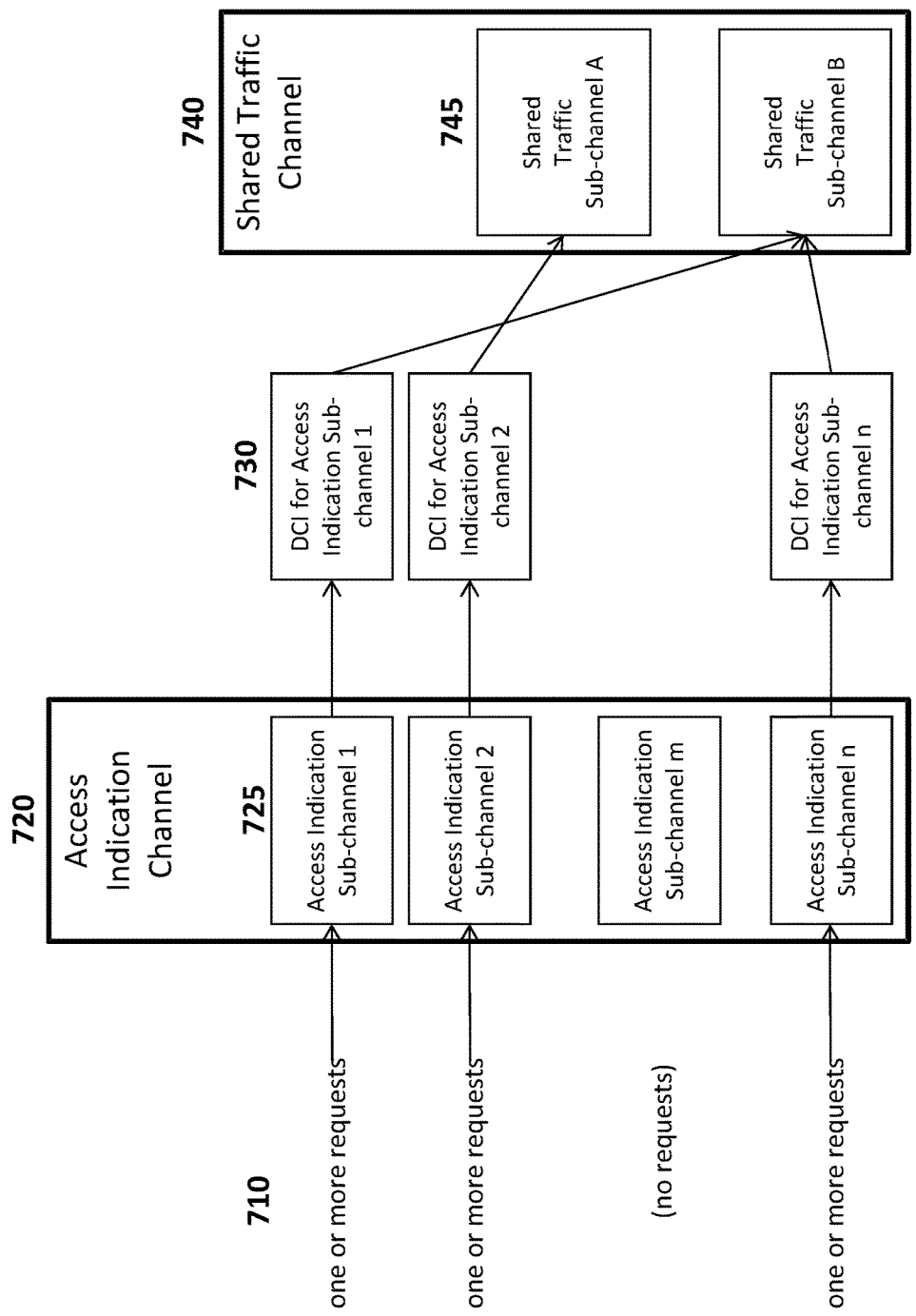
FIG. 7 illustrates communication via the access indication channel and the shared contention-based traffic channel, including sub-channels, in accordance with an embodiment of the present invention.

In more detail, FIG. 7 illustrates channel usage requests 710 which are received via access indication sub-channels 725 of an access indication channel 720. Grant messages 730 are transmitted in association with each of the access indication sub-channels. The grant messages indicate the configurations of the shared traffic sub-channels 745 of the shared traffic channel 740. When a device transmits a request on a particular access indication sub-channel, it monitors for the grant message associated with that sub-channel and uses the resources of the shared traffic sub-channel as indicated therein. As also illustrated in FIG. 7, no requests are received for access indication sub-channel m, and hence no resources are allocated for a corresponding shared traffic channel.

Further, shared traffic sub-channel B is used by requestors transmitting on both access indication sub-channel 1 and access indication sub-channel n. That is, in some embodiments, multiple access indication sub-channels can be associated with a single shared traffic sub-channel. For example, if only a limited number of channel usage requests are received, spread over multiple access indication sub-channels, there may be an N:1 mapping of channel usage requests onto one (or a few) shared traffic channels.

In various embodiments, communication devices monitor the downlink control channel for transmission grants. A transmission grant is a message indicating which communication devices are permitted to access an indicated part of the contention-based traffic channel at a given time, and/or parameters by which the communication devices are to access the contention-based traffic channel. These parameters may include communication resources to be used by the communication devices accessing the contention-based traffic channel. Communication resources may correspond to time slots, frequency bands, communication symbols, spreading codes or other indicator codes, or the like, of the communication medium. In one embodiment, a transmission grant is provided for each access indication sub-channel where an access indicator was received, and indicates the communication resources corresponding to the contention-based traffic sub-channel associated with that access indication sub-channel. A communication device may monitor the control channel for the transmission grant associated with a given access indication sub-channel which the communication device used to transmit its channel usage request. A transmission grant may define the radio resources assigned by the controller to the contention-based traffic channel and associated with an access node. In various embodiments, different contention-based sub-channels may be associated with different access nodes.

Following receipt of the transmission grant, each communication device initiates a contention-based transmission on the contention-based traffic channel in accordance with the requirements of the transmission grant. Contention-based transmissions can proceed according to a specified contention-based protocol. Different contention-based protocols may be associated with different contention-based traffic channels and or sub-channels. In one embodiment contention-based protocols may be specified dynamically, for example via the transmission grant message.

Embodiments of the present invention may be used in part to facilitate contention-based uplink communication from Machine-Type Communication (MTC) devices. This may facilitate deployment of large numbers of MTC devices having sporadic uplink data transmission behaviours, for example when data transmissions are event driven. The MTC devices request access to the contention-based traffic channel and then await an uplink transmission opportunity as indicated in a transmission grant received from a controller in the network.

Embodiments of the present invention facilitate scheduling of access to a contention-based traffic channel, and/or dynamic provisioning of the contention-based traffic channel based on demand. The amount of communication resource allocated to the contention-based traffic channel and the number of communication devices granted access to the contention-based traffic channel at a given time may be matched one to the other, such that the contention-based traffic channel is neither over-utilized nor under-utilized. Under-utilization may correspond to a situation in which more communication resources are allocated to the contention-based traffic channel than are necessary for a given service level and number of communication devices. Over-utilization may correspond to a situation in which too few communication resources are allocated to the contention-based traffic channel than are necessary for a given service level and number of communication devices, resulting in congestion and a higher amount of collisions.

In some embodiments, communication resources are allocated to the contention-based traffic channel so as to provide for one or more of: a target collision probability; a target error probability; a target expected number of retransmissions of each message on the shared channel; and a target spectral efficiency of the channel or sub-channel. The spectral efficiency may, for example, reflect a ratio of a number of contention-based messages successfully transmitted to an amount of communication resources assigned to the channel or sub-channel. Other measures of spectral efficiency or similar metrics may be used as would be readily understood by a worker skilled in the art.

In some embodiments, communication resources are allocated to the access indication channel so as to provide for one or more of: a target resource usage; a target latency for requesting a transmission opportunity; distinguishing amongst different types of transmission requests.

Figure 8:
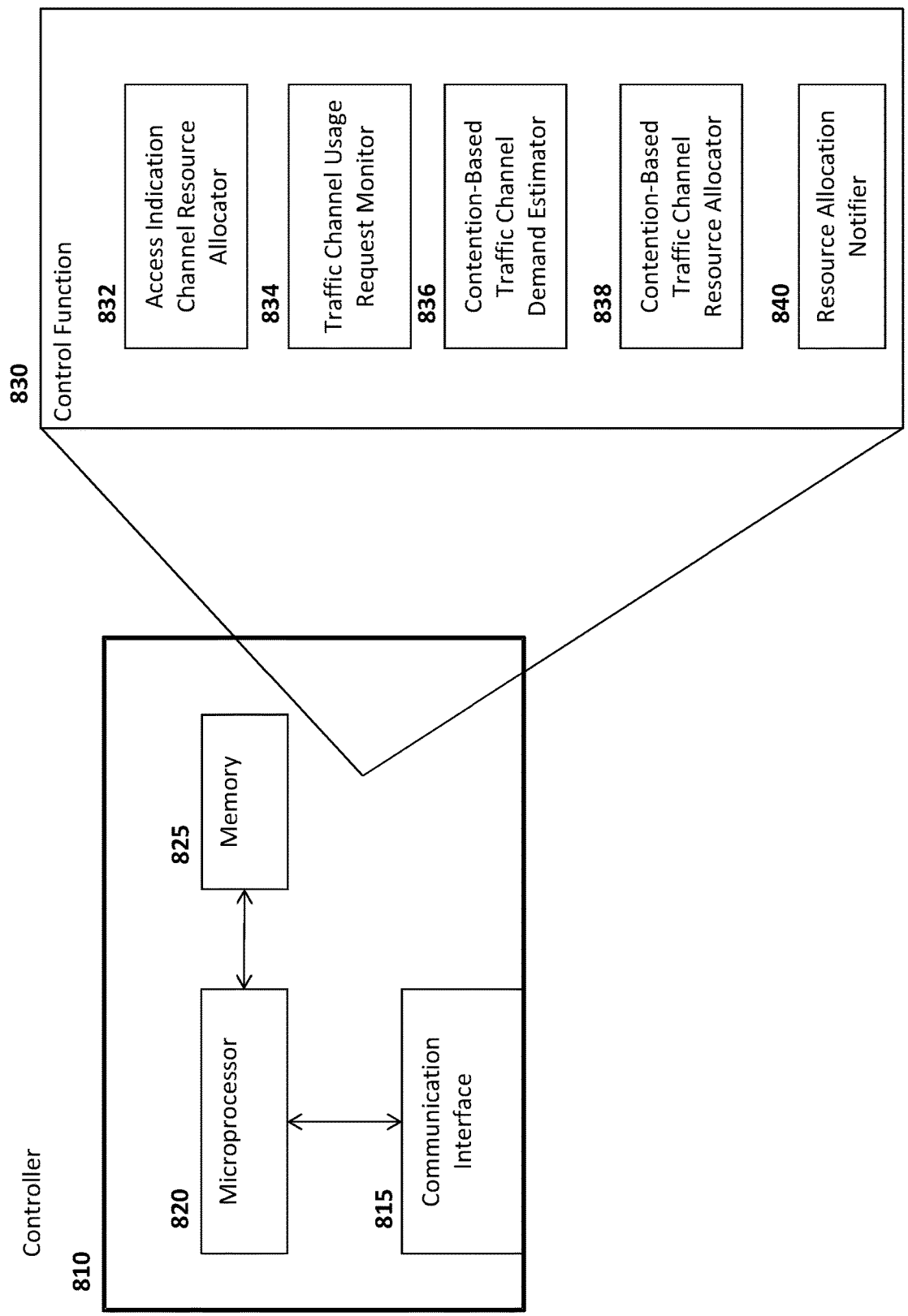
FIG. 8 illustrates a controller, provided in accordance with an embodiment of the present invention.

FIG. 8 illustrates a controller 810 and an associated control function 830, provided in accordance with an embodiment of the present invention. The controller 810 corresponds to a networked computing device having at least a communication interface/network interface 815, a microprocessor 820, and a memory component 825 storing program instructions for execution by the microprocessor, or an equivalent facility for performing computations. The controller 810 is provided as a functional aspect of the edge node 200, and is realized through operation of the network interface 815, microprocessor 820, and memory component 825. Alternatively, the controller 810 may be located in another component of the communication network infrastructure as a real or virtualized networked computing device. In some embodiments, the controller is provided as a virtual network function.

The control function 830 includes an access indication channel resource allocator 832, a traffic channel usage request monitor 834, a contention-based traffic channel demand estimator 836, a contention-based traffic channel resource allocator 838, and a resource allocation notifier 840. The access indication channel resource allocator 832 defines and allocates communication resources for use by the access indication channel, defines sub-channels thereof, and communicates allocations to the communication devices. The traffic channel usage request monitor 834 monitors the access indication channel, including sub-channels, for channel usage requests. The contention-based traffic channel demand estimator 836 estimates the number of communication devices requesting access to the contention-based traffic channel, including sub-channels thereof. The contention-based traffic channel resource allocator 838 allocates communication resources to the contention-based traffic channel and sub-channels thereof, based on the estimated number of communication devices requesting access. The contention-based traffic channel resource allocator 838 may also allocate communication devices to contention-based traffic sub-channels and generate a schedule for accessing the sub-channels. The resource allocation notifier 840 generates grant messages for transmission to the communication devices indicative of the communication resources and/or sub-channels to be used by the communication devices in accessing the contention-based traffic channel.

Figure 9:
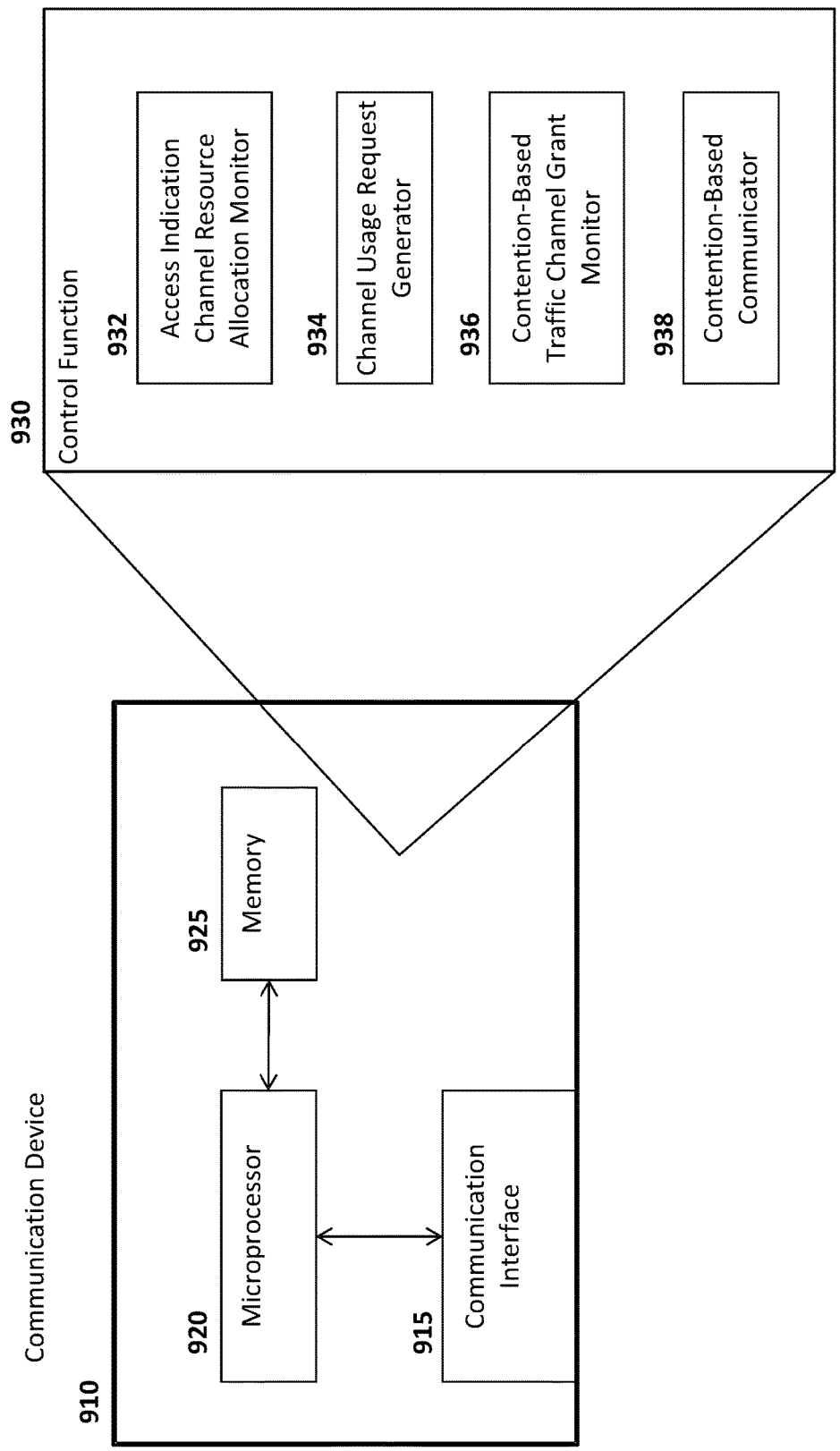
FIG. 9 illustrates a communication device, provided in accordance with an embodiment of the present invention.

FIG. 9 illustrates a communication device 910, such as a wireless communication terminal device, and an associated control function 930, provided in accordance with an embodiment of the present invention. The communication device corresponds to a networked computing device having at least a communication interface/network interface 915, a microprocessor 920, and a memory component 925 storing program instructions for execution by the microprocessor, or an equivalent facility for performing computations. The control function 930 is provided as a functional aspect of the communication device, and is realized through operation of the network interface 915, microprocessor 920, and memory component 925.

The control function 930 includes an access indication channel resource allocation monitor 932, a channel usage request generator 934, a contention-based traffic channel grant monitor 936, and a contention-based communicator 938. The access indication channel resource allocation monitor 932 monitors for system messages indicating what communication resources are to be used for the access indication channel, including sub-channels. The channel usage request generator 934 generates channel usage requests on an as-needed basis. Generated channel usage requests are transmitted onto the access indication channel via the communication interface. The contention-based traffic channel grant monitor 936 monitors a control channel for grant messages indicating when and how the communication device is to access the contention-based traffic channel. The contention-based communicator 938 is configured to perform contention-based communication on the contention-based traffic channel in accordance with a specified protocol.

According to embodiments, the communication device selects a sub-channel of an access indication channel based on predetermined attributes which are indicative of the communication device, the message, or both the communication device and the message. The selected sub-channel is used for communicating channel usage requests to a controller, for example a base station, wherein this the selected sub-channel has a plurality of attributes associated therewith, and these predetermined attributes noted above, are included in the plurality of attributes associated with the particular sub-channel. The communication device is configured to transmit a channel usage request using the selected sub-channel of the access indication channel. Subsequent to transmitting the request, the communication is configured to receive an indication of communication resources allocated to the contention-based communication channel which are to be used by the communication device in order to transmit the message. The communication device then proceeds with transmitting the message over the contention-based communication channel using the communication resources that were assigned therefor.

In some embodiments, the communication device is configured to transmit the channel usage request in association with a selected code. This selected code can be selected from a group of codes, wherein each of the codes can be indicative of one or more attributes that are indicative of the communication device, the message, or both the communication device and the message. The communication device is further configured to configure the channel usage request based on the selected code.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for allocating communication resources, the method comprising:
   receiving, over an uplink access indication channel, a set of uplink channel usage request signal codes from a plurality of communication devices requiring usage of a contention-based uplink communication channel for transmission of uplink data, the set of uplink channel usage request signal codes partitioned into multiple groups of signal codes, wherein each group of signal codes corresponds to a respective type of desired communication, wherein the contention-based uplink communication channel includes a plurality of sub-channels and wherein each sub-channel is associated with a type of desired communication;
   determining a current demand for each type of desired communication based on the received set of uplink channel usage request signal codes; and
   allocating communication resources to the contention-based uplink communication channel based on the determined current demand for each type of desired communication; and
   allocating communication resources to respective sub-channels based on the received uplink channel usage request signal codes.

2. The method of claim 1, further comprising transmitting an indication of the allocated communication resources for each type of desired communication to the plurality of communication devices via a downlink control channel.

3. The method of claim 1, wherein the uplink channel usage request signal codes include a first request signal code transmitted by one of the communication devices, the first request signal code selected from a group of signal codes corresponding to a respective type of desired communication.

4. The method of claim 1, wherein determining the current demand comprises one or more of: determining a number of the communication devices requesting usage of the contention-based uplink communication channel; determining a number of the communication devices requesting a type of desired communication; and determining communication requirements of the communication devices requesting a type of desired communication.

5. The method of claim 1, wherein allocating communication resources to the contention-based uplink communication channel based on the determined current demand for each type of desired communication comprises allocating said communication resources to provide one or more of the following: a target spectral efficiency for the contention-based uplink communication channel, a target amount of bandwidth per communication device to the contention-based uplink communication channel, a requested level of service to the plurality of communication devices and a target latency for communication via the contention-based uplink communication channel.

6. The method of claim 1, wherein allocating communication resources to the contention-based uplink communication channel based on the determined current demand for each type of desired communication comprises determining, based on the determined current demand, one or more waveforms for use in communicating on the contention-based uplink communication channel.

7. The method of claim 1, wherein allocating communication resources to the contention-based uplink communication channel based on the determined current demand for each type of desired communication comprises determining, based on the determined current demand, a contention-based protocol to be followed in communicating on the contention-based uplink communication channel.

8. A device for allocating communication resources, the device comprising:
   a receiver, configured to receive, over an uplink access indication channel, a set of uplink channel usage request signal codes from a plurality of communication devices requiring usage of a contention-based uplink communication channel for transmission of uplink data, the set of uplink channel usage request signal codes partitioned into multiple groups of signal codes, wherein each group of signal codes corresponds to a respective type of desired communication, wherein the contention-based uplink communication channel includes a plurality of sub-channels and wherein each sub-channel is associated with a type of desired communication; and a processor configured to determine a current demand for each type of desired communication based on the received set of uplink channel usage request signal codes, allocate communication resources to the contention-based uplink communication channel based on the determined current demand for each type of desired communication, and allocate communication resources to respective sub-channels based on the received uplink channel usage request signal codes.

9. The device of claim 8, wherein the uplink channel usage request signal codes include a first request signal code transmitted by one of the communication devices, the first request signal code selected from a group of signal codes corresponding to a respective type of desired communication.

10. The device of claim 8, wherein determining the current demand comprises one or more of: determining a number of the communication devices requesting usage of the contention-based uplink communication channel; determining a number of the communication devices requesting a type of desired communication; and determining communication requirements of the communication devices requesting a type of desired communication.

11. The device of claim 8, wherein the processor is further configured to allocate communication resources to the contention-based uplink communication channel to provide one or more of the following: a target spectral efficiency for the contention-based uplink communication channel, a target amount of bandwidth per communication device to the contention-based uplink communication channel, a requested level of service to the plurality of communication devices and a target latency for communication via the contention-based uplink communication channel.

12. A method for contention-based communication of a desired communication, the method comprising:

transmitting, over an uplink access indication channel, by a communication device, an uplink channel usage request signal code for usage of a contention-based uplink communication channel for transmission of uplink data, wherein the uplink channel usage request signal code is selected from one group of multiple groups of signal codes, wherein each group of signal codes corresponds to a respective type of desired communication, wherein the contention-based uplink communication channel includes a plurality of sub-channels and wherein each sub-channel is associated with a type of desired communication;

receiving, over a downlink control channel, by the communication device, an indication of communication resources allocated to a sub-channel of the contention-based uplink communication channel based on the uplink channel usage request signal code; and transmitting, by the communication device, the desired communication over the sub-channel of the contention-based uplink communication channel using the communication resources allocated.

13. The method of claim 12, wherein the group of signal codes is selected based on predetermined attributes of the communication device, the type of desired communication, or both the communication device and the type of desired communication.

14. The method of claim 12, wherein transmitting the uplink channel usage request signal code comprises configuring the uplink channel usage request based on the selected signal code.

15. The method of claim 1 wherein a group of signal codes further corresponds to one or more of: communication device attributes, location of the communication device and attributes of data to be transmitted.

16. The device of claim 8, wherein a group of signal codes further corresponds to one or more of: communication device attributes, location of the communication device and attributes of data to be transmitted.

17. The device of claim 8, wherein the processor is further configured to allocate communication resources to the contention-based uplink communication channel based on the determined current demand for each type of desired communication by determining, based on the determined current demand, one or more waveforms for use in communicating on the contention-based uplink communication channel.

18. The device of claim 8, wherein the processor is further configured to allocate communication resources to the contention-based uplink communication channel based on the determined current demand for each type of desired communication by determining, based on the determined current demand, a contention-based protocol to be followed in communicating on the contention-based uplink communication channel.

* * * * *